(12) United States Patent
Sato et al.

(10) Patent No.: US 8,778,474 B2
(45) Date of Patent: Jul. 15, 2014

(54) REPOSITIONABLE MEDIUM AND STACK THEREOF

(75) Inventors: Jay K. Sato, Mission Viejo, CA (US); Douglas W. Wilson, San Dimas, CA (US)

(73) Assignee: CCL Label, Inc., Framingham, MA (US)

( * ) Notice: Subject to any disclaimer, the term of this patent is extended or adjusted under 35 U.S.C. 154(b) by 322 days.

(21) Appl. No.: 13/081,488

(22) Filed: Apr. 6, 2011

(65) Prior Publication Data

US 2011/0244201 A1    Oct. 6, 2011

Related U.S. Application Data

(63) Continuation-in-part of application No. 12/829,386, filed on Jul. 2, 2010, now abandoned, which is a continuation-in-part of application No. 29/355,485, filed on Feb. 8, 2010, now abandoned, and a continuation-in-part of application No. 29/361,471, filed on May 11, 2010, now Pat. No. Des. 679,753.

(51) Int. Cl.
*B32B 9/06* (2006.01)
*B32B 3/06* (2006.01)
*B32B 7/12* (2006.01)

(52) U.S. Cl.
USPC ............... 428/40.1; 428/96; 428/99; 428/343

(58) Field of Classification Search
USPC .......... 428/40.1, 41.7, 42.1, 98, 99, 102–104, 428/156, 192, 194, 343; 40/299.01, 638
See application file for complete search history.

(56) References Cited

U.S. PATENT DOCUMENTS 237,223 A    2/1881   Weight
524,856 A    8/1894   Mitchell
(Continued)

FOREIGN PATENT DOCUMENTS

DE    3836795 A1    5/1990
EP     885752       12/1998
(Continued)

OTHER PUBLICATIONS

Response dated May 30, 2011 from related Canadian Application No. 135839.

(Continued)

*Primary Examiner* — Patricia L Nordmeyer
(74) *Attorney, Agent, or Firm* — McDonald Hopkins LLC

(57) ABSTRACT

A repositionable medium includes a base, a paper, and a first repositionable adhesive. The base has a top surface, a bottom surface, a first end edge, and a second end edge. The paper is fixedly coupled to the top surface of the base proximate to the first end edge. The paper has an inner edge and an outer edge. The outer edge is closer to the first end edge than the inner edge is to the first end edge. The inner edge is spaced a first distance from the first end edge of the base. The first repositionable adhesive is fixed to the bottom surface of the base and is not present in a first low adhesion area at a line across a width of the base and spaced a second distance from the second end edge of the base. The second distance equals the length of the first distance.

13 Claims, 11 Drawing Sheets

(56) References Cited

U.S. PATENT DOCUMENTS

| | | | |
|---|---|---|---|
| 586,391 A | 7/1897 | Pinney et al. |
| 2,248,317 A | 7/1941 | Van Cleef |
| 3,691,140 A | 9/1972 | Silver |
| 3,857,731 A | 12/1974 | Merrill, Jr. et al. |
| 4,019,759 A | 4/1977 | Stanton |
| 4,166,152 A | 8/1979 | Baker et al. |
| 4,389,060 A | 6/1983 | Cline |
| 4,422,672 A | 12/1983 | Levi |
| 4,424,244 A | 1/1984 | Puskadi |
| 4,516,871 A | 5/1985 | Leitman |
| 4,590,109 A | 5/1986 | Holmberg |
| 4,650,706 A | 3/1987 | Emmel |
| 4,786,696 A | 11/1988 | Bohnel |
| 4,798,401 A | 1/1989 | Greig |
| 4,810,763 A | 3/1989 | Mallya et al. |
| 4,837,062 A | 6/1989 | Dunshee et al. |
| 4,884,826 A | 12/1989 | Slagsvol |
| 4,895,746 A | 1/1990 | Mertens |
| 4,907,825 A | 3/1990 | Miles et al. |
| 4,907,904 A | 3/1990 | Baldwin |
| 4,944,888 A | 7/1990 | Mallya et al. |
| 4,970,984 A | 11/1990 | Vazquez |
| 4,985,302 A | 1/1991 | Sala et al. |
| 4,988,567 A | 1/1991 | Delgado |
| 4,994,322 A | 2/1991 | Delgado et al. |
| 5,011,189 A | 4/1991 | Olson |
| 5,045,569 A | 9/1991 | Delgado |
| 5,050,909 A | 9/1991 | Mertens et al. |
| 5,056,824 A | 10/1991 | Olson |
| 5,056,825 A | 10/1991 | Templet |
| 5,153,041 A | 10/1992 | Clements et al. |
| 5,249,827 A | 10/1993 | Olson |
| 5,283,091 A | 2/1994 | Darvell et al. |
| 5,299,833 A | 4/1994 | Madole, Jr. |
| 5,342,688 A | 8/1994 | Kitchin et al. |
| 5,366,776 A | 11/1994 | Mertens |
| 5,388,861 A | 2/1995 | Reiter |
| 5,390,819 A | 2/1995 | Kaye |
| 5,401,547 A | 3/1995 | Blackwell |
| 5,432,688 A | 7/1995 | Tobias et al. |
| 5,462,783 A | 10/1995 | Esselmann |
| 5,518,273 A | 5/1996 | Olson |
| 5,639,240 A | 6/1997 | Werzberger |
| 5,641,182 A | 6/1997 | Schwandt |
| 5,641,550 A | 6/1997 | Berman et al. |
| 5,656,705 A | 8/1997 | Mallya et al. |
| 5,670,226 A | 9/1997 | Yoshizawa et al. |
| 5,705,244 A | 1/1998 | Lee |
| 5,707,482 A | 1/1998 | Fusselman |
| 5,755,355 A | 5/1998 | Timmerman et al. |
| 5,795,636 A * | 8/1998 | Keller et al. ............ 428/40.1 |
| 5,874,144 A | 2/1999 | Kumar et al. |
| 5,876,067 A | 3/1999 | Kaplan |
| 5,911,442 A | 6/1999 | Olson |
| 5,948,494 A | 9/1999 | Levin |
| 5,967,561 A | 10/1999 | Glenn |
| 5,989,667 A | 11/1999 | Tayebi |
| 6,001,209 A | 12/1999 | Popat et al. |
| 6,013,154 A | 1/2000 | Thomas-Cote |
| 6,149,202 A | 11/2000 | Anzai |
| 6,150,035 A | 11/2000 | DeFife et al. |
| 6,217,443 B1 | 4/2001 | Green, Jr. |
| 6,220,504 B1 | 4/2001 | Flynn et al. |
| 6,220,505 B1 | 4/2001 | Flynn et al. |
| 6,254,955 B1 | 7/2001 | Kuo et al. |
| 6,265,043 B1 | 7/2001 | Vinyard et al. |
| 6,279,817 B1 | 8/2001 | Flynn et al. |
| 6,286,871 B1 | 9/2001 | Spector et al. |
| 6,352,198 B1 | 3/2002 | Flynn et al. |
| 6,357,651 B1 | 3/2002 | Flynn et al. |
| 6,364,198 B1 | 4/2002 | Flynn et al. |
| 6,364,366 B1 | 4/2002 | Schwartz |
| 6,367,689 B1 | 4/2002 | Flynn et al. |
| 6,375,065 B1 | 4/2002 | Flynn et al. |
| 6,415,976 B1 | 7/2002 | Flynn et al. |
| 6,425,519 B1 | 7/2002 | Flynn et al. |
| 6,427,905 B1 | 8/2002 | Flynn et al. |
| 6,435,967 B1 | 8/2002 | Michlin |
| 6,471,817 B1 | 10/2002 | Emmert |
| D467,273 S | 12/2002 | Brooks et al. |
| 6,488,999 B1 | 12/2002 | Flynn et al. |
| 6,499,652 B1 | 12/2002 | Flynn et al. |
| 6,503,591 B2 | 1/2003 | Kuo et al. |
| 6,523,737 B1 | 2/2003 | Flynn et al. |
| 6,543,379 B2 | 4/2003 | Schwartz |
| 6,576,315 B2 * | 6/2003 | Treleaven et al. ............ 428/40.1 |
| 6,582,546 B1 | 6/2003 | Micek |
| D477,360 S | 7/2003 | Larkins et al. |
| 6,617,000 B1 | 9/2003 | Denny et al. |
| 6,627,285 B2 | 9/2003 | Kuo et al. |
| 6,896,294 B2 | 5/2005 | Bidanset et al. |
| 7,040,051 B2 | 5/2006 | Windorski |
| D524,856 S | 7/2006 | Pascale et al. |
| 7,094,454 B2 | 8/2006 | Kuo et al. |
| 7,128,957 B2 | 10/2006 | Bratter |
| 7,140,135 B2 | 11/2006 | Irvine et al. |
| 7,225,570 B2 | 6/2007 | Windorski |
| 7,309,731 B2 | 12/2007 | Shih et al. |
| 7,467,487 B2 | 12/2008 | Sato et al. |
| D586,391 S | 2/2009 | Pascale |
| D591,341 S | 4/2009 | Fagan |
| 7,678,443 B2 | 3/2010 | Schulz et al. |
| D631,507 S | 1/2011 | Harrell |
| 2001/0031331 A1 | 10/2001 | Kuo et al. |
| 2002/0071926 A1 | 6/2002 | Yuh |
| 2002/0192415 A1 | 12/2002 | Vogler et al. |
| 2003/0020274 A1 | 1/2003 | Milliorn |
| 2003/0039786 A1 | 2/2003 | Milliorn et al. |
| 2003/0071703 A1 | 4/2003 | Machesky |
| 2003/0077413 A1 | 4/2003 | Shah |
| 2003/0232190 A1 | 12/2003 | O'Leary et al. |
| 2004/0228996 A1 | 11/2004 | Franzo |
| 2004/0247812 A1 | 12/2004 | Milliorn et al. |
| 2005/0058812 A1 | 3/2005 | Seidl et al. |
| 2005/0194090 A1 | 9/2005 | Milliorn |
| 2005/0233101 A1 | 10/2005 | Wittmeyer, Jr. |
| 2005/0274272 A1 | 12/2005 | Machesky |
| 2006/0057324 A1 | 3/2006 | Phillips et al. |
| 2006/0062956 A1 | 3/2006 | Chandaria et al. |
| 2006/0068145 A1 | 3/2006 | Chandaria |
| 2006/0097510 A1 | 5/2006 | Sharpe |
| 2006/0124237 A1 | 6/2006 | Nordin et al. |
| 2006/0204700 A1 | 9/2006 | Kiraly |
| 2007/0071971 A1 | 3/2007 | Drogan |
| 2007/0148392 A1 | 6/2007 | Keravec et al. |
| 2007/0212507 A1 | 9/2007 | Arst et al. |
| 2009/0091117 A1 | 4/2009 | Shoffstall-Ridley |
| 2009/0110863 A1 | 4/2009 | Dangami |
| 2009/0142531 A1 | 6/2009 | Killey |
| 2009/0208686 A1 | 8/2009 | Ho |
| 2011/0156381 A1 | 6/2011 | Kuo et al. |

FOREIGN PATENT DOCUMENTS

| | | |
|---|---|---|
| EP | 928701 | 7/1999 |
| WO | 95/32097 | 11/1995 |
| WO | 00/52080 | 9/2000 |
| WO | 2009/046203 | 4/2009 |

OTHER PUBLICATIONS

Response dated May 31, 2011 from related Canadian Application No. 137793.

Response dated Jun. 3, 2011 from related Mexican Application No. MX/f/2010/001577.

Notice of allowance dated Jul. 13, 2011 from related Mexican Application No. MX/f/2010/001577.

Notice of allowance dated Sep. 15, 2011 from related Mexican Application No. MX/f/2011/000514.

Notice of allowance dated Jun. 7, 2011 from related Mexican Application No. MX/f/2011/000515.

Notice of allowance dated Apr. 25, 2011 from related Mexican Application No. MX/f/2011/000516.

(56) References Cited

OTHER PUBLICATIONS

Notice of allowance dated Apr. 25, 2011 from related Mexican Application No. MX/f/2011/000517.
Notice of allowance dated Apr. 29, 2011 from related Mexican Application No. MX/f/2011/000518.
Notice of allowance dated Apr. 25, 2011 from related Mexican Application No. MX/f/2011/000519.
Notice of allowance dated Apr. 25, 2011 from related Mexican Application No. MX/f/2011/000520.
Restriction requirement dated Nov. 10, 2011 from related U.S. Appl. No. 29/355,485.
Response to restriction dated Feb. 7, 2012 from related U.S. Appl. No. 29/355,485.
Notice of allowance dated Mar. 19, 2012 from related U.S. Appl. No. 29/355,485.
Notice of Allowance dated Jan. 10, 2012 from related Mexican Application No. MX/f/2011/001839.
Notice of Allowance dated Mar. 14, 2012 from related Mexican Application No. MX/f/2011/001840.
Notice of Allowance dated Jan. 10, 2012 from related Mexican Application No. MX/f/2011/001841.
Notice of Allowance dated Jan. 10, 2012 from related Mexican Application No. MX/f/2011/001842.
Notice of Allowance dated Jan. 10, 2012 from related Mexican Application No. MX/f/2011/001843.
Notice of Allowance dated May 14, 2012 from related U.S. Appl. No. 29/361,471.
Restriction Requirement dated Jun. 18, 2012 from related U.S. Appl. No. 12/829,386.
Response to Restriction Requirement dated Jul. 10, 2012 from related U.S. Appl. No. 12/829,386.
Notice of Allowance dated Apr. 20, 2012 from related U.S. Appl. No. 29/412,791.
Notice of Allowance dated May 1, 2012 from related U.S. Appl. No. 29/412,793.
Notice of Allowance dated May 2, 2012 from related U.S. Appl. No. 29/412,795.
Notice of Allowance dated Jun. 6, 2012 from related U.S. Appl. No. 29/418,047.
Notice of Allowance dated Jun. 26, 2012 from related U.S. Appl. No. 29/418,050.
Notice of Allowance dated Jul. 18, 2012 from related U.S. Appl. No. 29/355,485.
Office action issued in U.S. Appl. No. 12/829,386 on Aug. 1, 2012, 37 pages.
Office action issued in U.S. Appl. No. 12/829,386 on Nov. 27, 2012, 21 pages.
Response to Office action issued in U.S. Appl. No. 12/829,386 on Oct. 31, 2012, 15 pages.
Response to Office action issued in U.S. Appl. No. 12/829,386 on Apr. 29, 2013, 21 pages.
Final Office action in U.S. Appl. No. 12/829,386 on May 13, 2013, 27 pages.
Notice of Allowance issued in Design U.S. Appl. No. 29/412,791 on Sep. 18, 2013,18 pages.
Notice of Allowance issued in Design U.S. Appl. No. 29/412,791 on Mar. 27, 2013,18 pages.
CPA filed in Design U.S. Appl. No. 29/412,791 on Nov. 1, 2012, 29 pages.
CPA filed in Design U.S. Appl. No. 29/412,791 on Jul. 19, 2012, 17 pages.
CPA filed in Design U.S. Appl. No. 29/355,485 on Jul. 19, 2012, 17 pages.
Notice of Allowance issued in Design U.S. Appl. No. 29/355,485 on May 24, 2013, 19 pages.
Written Opinion and Search Report issued in PCT/US2012/031033, on Aug. 9, 2012, 11 pages.
http://www.theofficedealer.com/mm5/merchant.mvc?Screen=PROD&Product_Code=MMM686FSMB&Category_Code=&fe1=bg1 (which shows Post-it Brand Durable Filing Tabs having model No. 686F-SMB), Feb. 10, 2010.
http://www.3m.com/US/office/postit/products/prod_ft_dur.html (which shows Post-it Brand Durable Tabs), Feb. 10, 2010.
http://www.3m.com/us/office/postit/products/prod_ft_port.html (which shows Post-it Brand Portable Flags and Notes), Feb. 10, 2010.
http://www.3m.com/us/office/postit/products/prod_ft_ss.html (which shows Post-it Brand Flags), Feb. 10, 2010.
http://milo.com/post-it-info-tabs-3-38-x-2-34-greenblue-25-flags-per-pad-pack-of-2-pads (which shows Post-it Brand Note Tabs), Feb. 10, 2010.
Office action dated Jun. 14, 2010 from related Canadian Application No. 134378.
Response dated Nov. 3, 2010 from related Canadian Application No. 134378.
Office action dated Nov. 17, 2010 from related Canadian Application No. 134378.
Response dated Jan. 11, 2011 from related Canadian Application No. 134378.
Office action dated Jul. 26, 2010 from related Canadian Application No. 135839.
Response dated Nov. 4, 2010 from related Canadian Application No. 135839.
Office action dated Nov. 17, 2010 from related Canadian Application No. 135839.
Response dated Dec. 30, 2010 from related Canadian Application No. 135839.
Office action dated Feb. 8, 2011 from related Canadian Application No. 135839.
Office action dated Nov. 10, 2010 from related Mexican Application No. MX/f/2010/000923.
Response dated Feb. 15, 2011 from related Mexican Application No. MX/f/2010/000923.
Notice of allowance dated Mar. 10, 2011 from related Mexican Application No. MX/f/2010/000923.
Office action dated Nov. 17, 2010 from related Canadian Divisional Application No. 137793.
Response dated Jan. 11, 2011 from related Canadian Divisional Application No. 137793.
Office action dated Feb. 4, 2011 from related Canadian Divisional Application No. 137793.
Office action dated Nov. 17, 2010 from related Canadian Divisional Application No. 137792.
Response dated Jan. 11, 2011 from related Canadian Divisional Application No. 137792.
Office action dated Nov. 17, 2010 from related Canadian Divisional Application No. 137791.
Response dated Jan. 11, 2011 from related Canadian Divisional Application No. 137791.
Office action dated Nov. 17, 2010 from related Canadian Divisional Application No. 137790.
Response dated Jan. 11, 2011 from related Canadian Divisional Application No. 137790.
Office action dated Mar. 9, 2011 from related Mexican Application No. MX/f/2010/001577.

\* cited by examiner

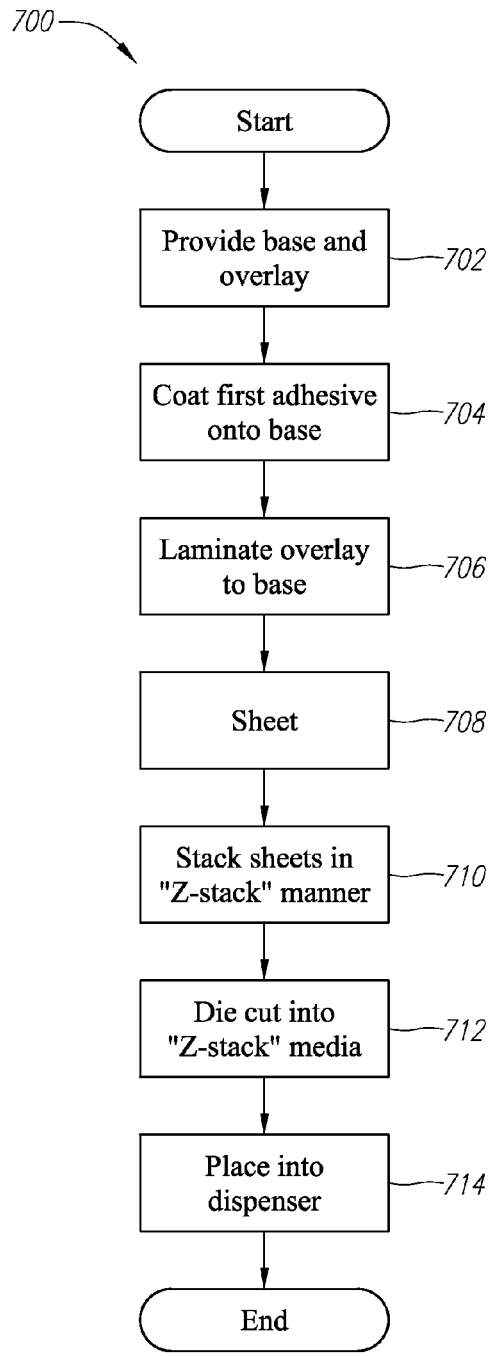
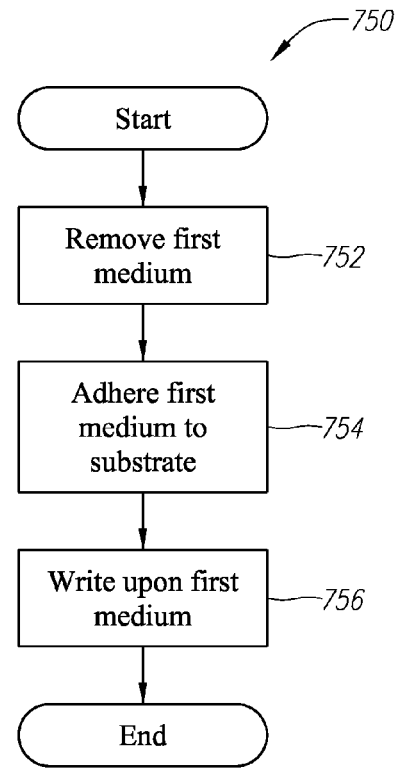
FIG. 11
FIG. 12

REPOSITIONABLE MEDIUM AND STACK THEREOF

CROSS-REFERENCE TO RELATED APPLICATIONS

This application is a continuation-in-part of U.S. patent application Ser. No. 12/829,386, filed Jul. 2, 2010, now abandoned entitled "Note Sheet and Pads Thereof and Related Method" by Jay K. Sato, Eric Kim, Susan L. Broyles, Darren S. Ferris, Cheng-Chung Chang, and Tsun-Rung Hsu, which is a continuation-in-part of U.S. patent application Ser. No. 29/355,485, filed Feb. 8, 2010, now abandoned entitled "Note Sheets and Related Pads of Note Sheets" by Jay K. Sato, Eric Kim, Susan L. Broyles, Darren S. Ferris, Cheng-Chung Chang, and Tsun-Rung Hsu, and a continuation-in-part of U.S. patent application Ser. No. 29/361,471, filed May 11, 2010, now U.S. Pat.No. D,679,753 entitled "Note Sheets and Related Pads of Note Sheets" by Jay K. Sato, Eric Kim, Susan L. Broyles, Darren S. Ferris, Cheng-Chung Chang, and Tsun-Rung Hsu. U.S. patent application Ser. No. 12/829,386, U.S. patent application Ser. No. 29/355,485, and U.S. patent application Ser. No. 29/361,471 are all incorporated by reference herein in their entireties.

FIELD OF THE INVENTION

The present invention relates generally to media of the type including a repositionable adhesive and relates more particularly to a novel medium of the aforementioned type, to a plurality of such media arranged in a stack, the method of manufacturing such media, and the method of using such media.

BACKGROUND

Media of the type including a repositionable adhesive are commonly used in a variety of venues including, but not limited to, homes, workplaces, and schools, and for a variety of applications, such as note-taking. One common type of medium having a repositionable adhesive is often referred to in the art as a repositionable note paper and includes a small sheet of paper having a top surface and a bottom surface, the top surface is receptive to markings, the bottom surface having a repositionable adhesive applied to a portion thereof, typically as a band of adhesive applied alongside one edge of the sheet.

In use, a handwritten or machine-printed marking is made on the top surface of the sheet, and the sheet is adhered to a desired object by pressing the adhesive band directly against the object. Often, prior to use, a plurality of identical such media are stacked on top of each other and held together using the adhesive bands to form a pad. The media can be stacked with their respective adhesive bands aligned with one another. For such stacks, markings can be made on the top sheet prior to separating the top sheet from the remainder of the pad, or the top sheet can be separated from the pad prior to applying a marking to the separated sheet.

In another type of stack, the media can be arranged in an alternating pattern in which each sheet is rotated 180 degrees relative to its adjacent neighbors with respect to their respective adhesive bands. The aforementioned type of stack is often referred to as an "accordion stack" or as a "Z-stack," due to the appearance of the stack from its side when the top and bottom sheets of the stack are gently pulled in a direction away from one another. Such stacks can be used in conjunction with a slotted dispenser so that individual sheets can be separated from the stack by pulling the free end of the top sheet up through a narrow slot in the dispenser. Once the sheet has been removed from the dispenser, it can be marked and adhered to a desired substrate. Such stacks can also be used without a dispenser, in which case the marking can be applied to the sheet either before or after separating the sheet from the remainder of the stack.

Another common type of repositionable medium is often referred to in the art as a repositionable flag and includes a rectangular strip of polymeric film divided laterally into a first portion and a second portion, the first portion is usually longer than the second portion. The first portion, which can be translucent, has a repositionable adhesive applied to the bottom surface thereof and has a coating applied to the top surface thereof that is receptive to handwritten or machine-printed markings. The second portion can be devoid of adhesive on its bottom surface and can have a coating over its top surface that is receptive to handwritten or machine-printed markings. In addition, the top surface of the second portion can be coated with a colored ink and can additionally include pre-printed information.

The above-described repositionable flags are often arranged in "Z-stacks," with individual flags being dispensed from the "Z-stack" using a slotted dispenser. In use, a flag is dispensed from the "Z-stack," and the flag is adhered to a desired object, such as a sheet of paper. If desired, markings can be made on the first portion and/or the second portion of the tape, either before or after the tape is adhered to a desired object. When the desired object is paper, the tape is can be positioned relative to the sheet of paper so that the second portion of the tape extends outside the boundaries of the sheet of paper, with the first portion of the tape positioned within the boundaries of the sheet. In this manner, the second portion can serve as a flag to identify a portion of the paper of interest, with the first portion of the tape being translucent so as not to obscure any printed matter located therebeneath.

Still another common type of repositionable medium includes a sheet of polymeric film divided into a first portion and a second portion, the second portion extending laterally from the first portion as a tab. The first portion, which can be translucent, can have a repositionable adhesive applied to the bottom surface thereof and has a coating applied to the top surface thereof that is receptive to handwritten or machine-printed markings. The second portion can be devoid of adhesive on its bottom surface and can have a small sheet of paper, which can be colored, adhered to its top surface, the sheet of paper is receptive to handwritten or machine-printed markings. Analogously to the repositionable note flags discussed above, markings can be made on the paper sheet and/or on top of the coated first portion, and the first portion can be adhered to a desired object.

However, in contrast with the aforementioned repositionable note flags, these tabbed media are not arranged in a "Z-stack" prior to use, but rather, are stacked so that all of the first portions of the polymeric film are aligned with one another and so that all of the second portions of the polymeric film are aligned with one another. The reason why a "Z-stack" has not been used for this type of medium is that, if a "Z-stack" arrangement were to be used, the adhesive area on the bottom of a first medium would come into direct contact with the paper portion of a second medium located directly beneath the first medium. Such contact between the adhesive area of the first medium and the paper of the second medium would undesirably result in the delamination or splitting of the paper from the second medium as the first medium is pulled away from the second medium.

It should, therefore, be appreciated that there is a need for a repositionable medium that can resist delamination when removed from a "Z-stack" arrangement. The present invention satisfies this need.

SUMMARY

The present invention includes a repositionable medium. The repositionable medium includes a base having a top surface, a bottom surface, a first end edge, and a second end edge. The repositionable medium also includes a paper fixedly coupled to the top surface of the base proximate to the first end edge. The paper has an inner edge and an outer edge, with the outer edge being closer to the first end edge than the inner edge is to the first end edge. The inner edge is spaced from the first end edge of the base by a first distance. The repositionable medium also includes a first repositionable adhesive fixed to the bottom surface of the base. The first repositionable adhesive not being present in a first low adhesion area at a line across a width of the base and spaced from the second end edge of the base by a second distance. The second distance is equal in length to the first distance.

In other, more detailed features of the invention, the first low adhesion area extends entirely across the width of the base. Also, the first low adhesion area can be devoid of adhesive. Also, the repositionable medium can further include a second repositionable adhesive. The second repositionable adhesive occupies at least a portion of the first low adhesion area. The second repositionable adhesive is less tacky than the first repositionable adhesive.

In other, more detailed features of the invention, the second repositionable adhesive is the same as the first repositionable adhesive and the second repositionable adhesive has a lower coat weight than the first repositionable adhesive. Also, the first low adhesion area can extend entirely across the width of the base and can extend from the second end edge of the base to slightly beyond the line spaced from the second end edge by the second distance. Also, the first low adhesion area can extend entirely across the width of the base from a third distance slightly less than the second distance to a fourth distance slightly greater than the second distance. Also, the first repositionable adhesive can be applied to the bottom surface of the base from the second end edge of the base to the third distance. The first repositionable adhesive can also be applied to the bottom surface of the base from the fourth distance to a fifth distance, with the fifth distance spaced from the first end edge and can be greater than the first distance.

In other, more detailed features of the invention, the first repositionable adhesive is not present in a second low adhesion area positioned along the second end edge of the base. The first repositionable adhesive can occupy at least some of the space between the first low adhesion area and the second low adhesion area. Also, both the first low adhesion area and the second low adhesion area can be devoid of adhesive.

In other, more detailed features of the invention, the base can include a polymeric film. Also, the polymeric film can be translucent. Also, at least a portion of the polymeric film can be coated with a marking-receptive coating.

Also, the paper can be fixedly coupled to the base using an adhesive.

The present invention also includes a stack of repositionable media including a plurality of repositionable media. Each of the plurality of repositionable media includes a base. The base has a top surface, a bottom surface, a first end edge, and a second end edge. Each of the plurality of repositionable media also includes a paper fixedly coupled to the top surface of the base proximate to the first end edge. The paper has an inner edge and an outer edge. The outer edge is closer to the first end edge than the inner edge is to the first end edge and the inner edge is spaced from the first end edge of the base by a first distance. Each of the plurality of repositionable media also includes a first repositionable adhesive fixed to the bottom surface of the base. The first repositionable adhesive is not present in a first low adhesion area at a line across a width of the base and spaced from the second end edge of the base by a second distance. The second distance is equal in length to the first distance. The plurality of repositionable media is arranged in a Z-stack. The inner edge of the paper of a first repositionable medium is aligned with the first low adhesion area on a second repositionable medium positioned directly thereover.

The present invention also includes a repositionable medium. The repositionable medium including a base. The base has a top surface and a bottom surface. The repositionable medium also includes a paper fixed to the top surface of the base, a first repositionable adhesive fixed to the bottom surface of the base in a first high adhesion area, and a second repositionable adhesive fixed to the bottom surface of the base in a first low adhesion area. The first low adhesive is different than the first high adhesion area and the second repositionable adhesive having less adhesive strength than the first repositionable adhesive. Also, the paper can cover a portion of the top surface of the base.

The present invention also includes a stack of repositionable media including a plurality of repositionable media. Each of the plurality of repositionable media includes a base, and the base has a top surface and a bottom surface. Each of the plurality of repositionable media also includes a paper fixed to the top surface of the base, a first repositionable adhesive fixed to the bottom surface of the base in a first high adhesion area, and a second repositionable adhesive fixed to the bottom surface of the base in a first low adhesion area. The first low adhesion area is different than the first high adhesion area, and the second repositionable adhesive has less adhesive strength than the first repositionable adhesive. The base has a first end edge and a second end edge. The paper has a first edge proximate to the first end edge of the base and a second edge distal to the first end edge of the base. The second edge of the paper is spaced from the first end edge of the base by a first distance. The plurality of repositionable media is arranged in a Z-stack, with the second edge of the paper of a first repositionable medium aligned with the first low adhesion area of the second repositionable adhesive of a second repositionable medium positioned directly thereover.

The present invention also includes a repositionable medium. The repositionable medium includes a base. The base having a top surface and a bottom surface. The repositionable medium also includes a paper fixed to the top surface of the base, and a first repositionable adhesive fixed to the bottom surface of the base in a first high adhesion area and in a second high adhesion area. At least a portion of the first and second high adhesion areas are spaced apart from one another.

In other, more detailed features of the invention, the paper can have a first edge proximate to the first end edge of the base and a second edge distal to the first end edge of the base. The second edge of the paper can be spaced from the first end edge of the base by a first distance and the first high adhesion area of the first repositionable adhesive can be spaced from the second end edge of the base by a second distance that can be slightly greater in length than the first distance. The second high adhesion area of the first repositionable adhesive can be positioned over at least a portion of the bottom surface and can extend from the second end edge of the base to a third distance from the second end edge of the base. The third distance can be slightly less in length than the first distance.

The present invention also includes a stack of repositionable media including a plurality of repositionable media. Each of the plurality of repositionable media includes a base. The base has a top surface and a bottom surface. Each of the plurality of repositionable media also includes a paper fixed to the top surface of the base, and a first repositionable adhesive fixed to the bottom surface of the base in a first high adhesion area and in a second high adhesion area. At least a portion of the first and second high adhesion areas are spaced apart from one another.

The present invention also includes a repositionable medium. The repositionable medium includes a base that includes a top surface and a bottom surface, a paper fixed to the top surface of the base, a first repositionable adhesive fixed to the bottom surface of the base, and a non-adhesive layer applied to the top of the paper along at least one edge for adhering the paper to the base.

Other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. It should be noted that the drawings are not drawn to scale. In the drawings wherein like reference numerals represent like parts:

FIG. 11 is a flowchart for a method of manufacturing a repositionable medium; and FIG. 12 is a flowchart for a method of using a repositionable medium.

DETAILED DESCRIPTION OF THE EMBODIMENTS

The present invention is embodied in a repositionable medium, a stack of repositionable media, and related methods. The repositionable media come in a multitude of configurations. A few non-limiting examples of repositionable media, stacks thereof, and related methods are discussed below.

As noted above, the present invention is directed at the above-described problem of delamination occurring within a "Z-stack" of repositionable media of the type including a paper sheet fixed to a base having a repositionable adhesive. According to one approach of the present invention, this problem can be ameliorated by providing a lower strength repositionable adhesive in one or more low adhesion areas that can be aligned with one or more of the edges of the paper for the medium positioned thereunder, with a higher strength repositionable adhesive provided in one or more high adhesion areas. As used herein, adhesive strength means peel adhesion or tack adhesion as determined by Pressure Sensitive Tape Council test methods PSTC-101 and PSTC-16. According to another approach, this problem can be ameliorated by not providing any adhesive in one or more of the low adhesion areas that can be aligned with one or more of the edges of the paper for the medium positioned thereunder. According to yet another approach, this problem can be ameliorated by providing a release on top of the edges of the paper sheet to inhibit adhesion with the repositionable adhesive of the medium positioned thereover. According to still yet another approach, this problem can be ameliorated by gluing or taping the edges of the paper down to its respective base.

Figure 1A:
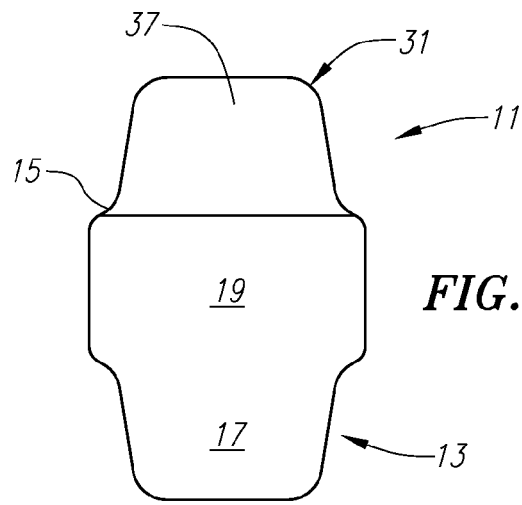
FIGS. 1(a), 1(b), and 1(c) are top plan, side elevational, and bottom plan views, respectively, of a first embodiment of a repositionable medium.
Figure 1B:
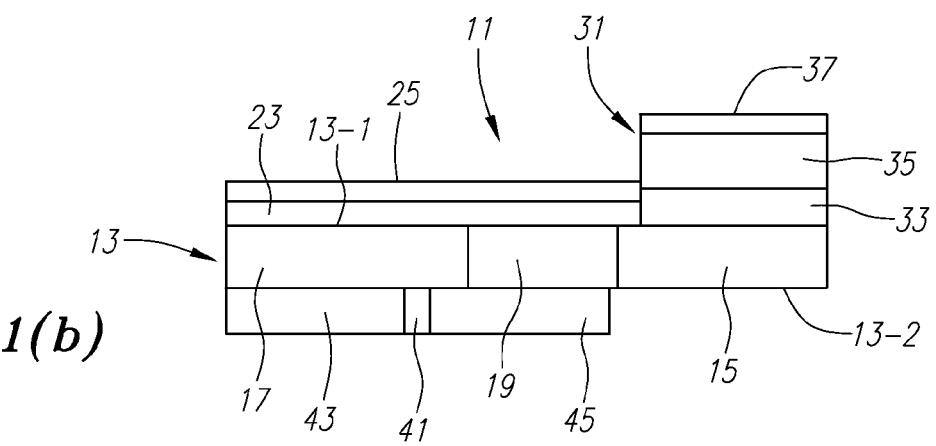
Figure 1C:
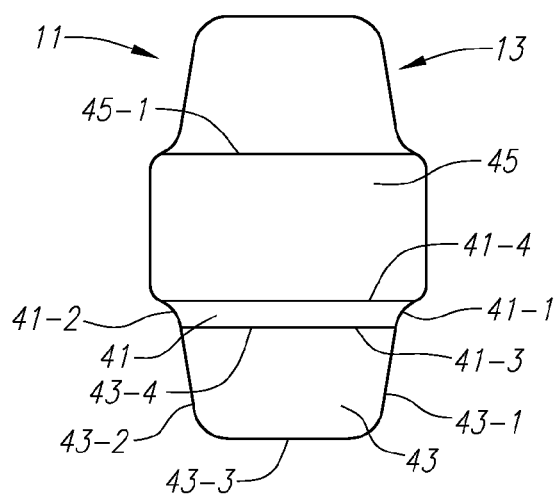

Referring now to FIGS. 1(a), 1(b), and 1(c), there are shown top plan, side elevational, and bottom plan views, respectively, of a first embodiment of a repositionable medium, the repositionable medium being represented generally by reference numeral 11. (For illustrative purposes, certain features of medium 11 are not shown in all views.)

Figure 2A:
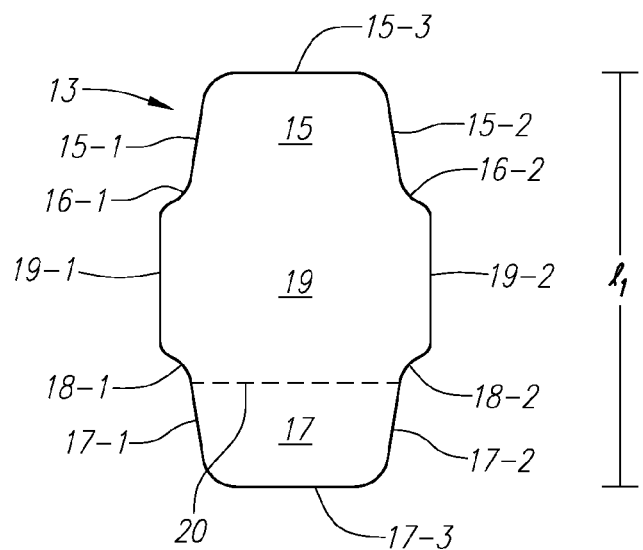
FIGS. 2(a), 2(b), and 2(c) are top plan, side elevational, and bottom plan views, respectively, of the base shown in FIG. 1(a)
Figure 2B:
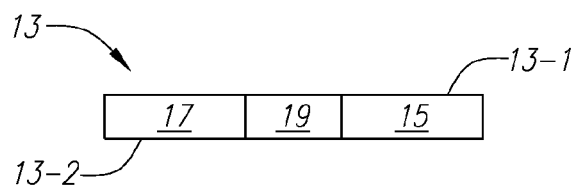
Figure 2C:
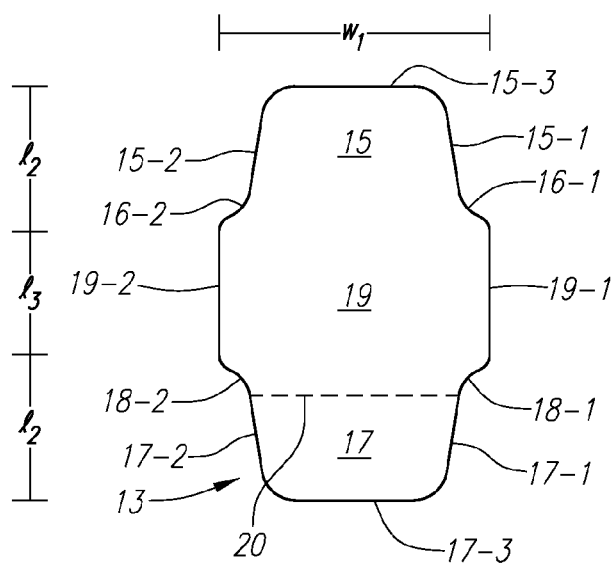

Medium 11 can include a base 13, which is also shown separately in FIGS. 2(a) through 2(c). Base 13, which can be a one-piece structure having a top surface 13-1 and a bottom surface 13-2, can be made of a translucent polymeric film, for example, a translucent (clear or tinted) polyethylene terephthalate (PET) film. Such a PET film can have a thickness, for example, of about 125 μm. Base 13 can be shaped to include a first end portion 15, a second end portion 17, and an intermediate portion 19, first end portion 15 and second end portion 17 are spaced apart from one another, with intermediate portion 19 extending between and interconnecting first end portion 15 and second end portion 17.

The first end portion 15 can have a generally trapezoidal shape when viewed from above and can be shaped to include a first side edge 15-1, a second side edge 15-2, and an end edge 15-3. The corner where end edge 15-3 meets first side edge 15-1 and the corner where end edge 15-3 meets second side edge 15-2 can be rounded. In addition, first side edge 15-1 can have a slight concavity 16-1 just before meeting intermediate portion 19, and second side edge 15-2 can have a corresponding concavity 16-2 just before meeting intermediate section 19. Second end portion 17 can have a generally trapezoidal shape when viewed from above and can be shaped to include a first side edge 17-1, a second side edge 17-2, and an end edge 17-3. The corner where end edge 17-3 meets first side edge 17-1 and the corner where end edge 17-3 meets second side edge 17-2 can be rounded.

In addition, first side edge 17-1 can have a slight concavity 18-1 just before meeting intermediate portion 19, and second side edge 17-2 can have a corresponding concavity 18-2 just before meeting intermediate portion 19. Intermediate portion 19 can have a generally rectangular shape when viewed from above and can include a first side edge 19-1 and a second side edge 19-2. Base 13 can be symmetric about both its longitudinal centerline and its lateral centerline, and first end portion 15 and second end portion 17 can be mirror-images of one another.

Exemplary dimensions for base 13 can include a length $l_1$ measured from end edge 15-3 to end edge 17-3 of approximately 38.1 mm and a width $w_1$ measured from side edge 19-1 to side edge 19-2 of approximately 25.4 mm. In addition, each of portions 15 and 17 can have a length $l_2$ of 14.3 mm, and portion 19 can have a length $l_3$ of approximately 10.3 mm. In other embodiments, length $l_1$ can range from approximately 28.5 mm to approximately 47.7 mm, lengths $l_2$ and $l_3$ can range from approximately 9.5 mm to approximately 15.9 mm, and width $w_1$ can range from approximately 25.4 mm to approximately 76.2 mm.

Referring back to FIG. 1(b), medium 11 can further include a topcoat 23, which can be applied directly over top surface 13-1 of base 13 in at least the areas corresponding to end portion 17 and intermediate portion 19. Topcoat 23 can be a conventional writing-receptive coating and can be used to render base 13 receptive to handwritten markings, such as those made, for example, by pen, marker and/or pencil, and/or to machine-printed markings, such as those made, for example, by typewriter and/or printer. Writable release coat 25, which can be applied directly over the entirety of topcoat 23 or a portion of topcoat 23, can be a conventional writable release coating and can be used to minimize adhesion of base 13 to a repositionable adhesive brought into contact therewith.

Figure 3A:
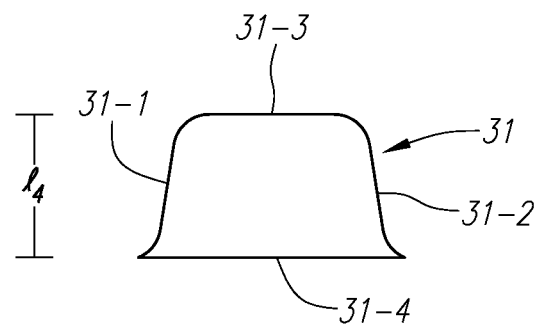
FIGS. 3(a) and 3(b) are top plan and side elevational views, respectively, of the overlay shown in FIG. 1(a)
Figure 3B:
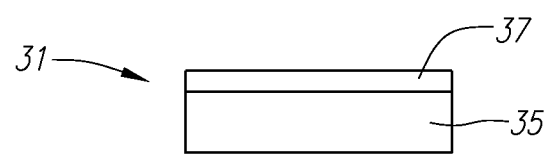

Medium 11 can also include an overlay 31, which is also shown separately in FIGS. 3(a) and 3(b). Overlay 31 can be securely fixed to top surface 13-1 of base 13 in first end portion 15 using a suitable adhesive 33, which adhesive can be, for example, an adhesive coating or a strip of double-sided tape. Overlay 31 can have a generally trapezoidal shape and can include a first side edge 31-1, a second side edge 31-2, an outer edge 31-3, and an inner edge 31-4. Overlay 31 can be dimensioned so that first side edge 31-1, second side edge 31-2 and outer edge 31-3 lie substantially flush with first side edge 15-1, second side edge 15-2, and end edge 15-3, respectively, of first end portion 15, with inner edge 31-4 of overlay 31 lying inwardly from end edge 15-3 a short distance from intermediate portion 19. Where, for example, base 13 has the dimensions specified above, overlay 31 can have a length $l_4$, a first distance, from outer edge 31-3 to inner edge 31-4 of approximately 12.7 mm. In other embodiments, length $l_4$ can range from approximately 9.5 mm to approximately 15.9 mm. A phantom line 20 on the medium can be defined extending from first side edge 17-1 to second side edge 17-2 spaced at a distance equal to length $l_4$, a second distance, measured from end edge 17-3. See FIG. 2(a).

Overlay 31 can be a non-translucent material and can include, for example, a sheet of paper 35 that is receptive to handwritten markings, such as those made, for example, by pen, marker and/or pencil, and/or to machine-printed markings, such as those made, for example, by typewriter and/or printer. Paper 35 can include colored paper or white paper and can be either coated or uncoated. A writable release coating 37 can be applied to at least a portion of the top surface of paper 35 to minimize adhesion of overlay 31 to a repositionable adhesive of another medium 11 brought into contact therewith.

Referring back to FIG. 1(c), medium 11 can further include a plurality of adhesive patches 41, 43 and 45 located on bottom surface 13-2 of base 13. As used herein, the term "plurality" means two or more. Adhesive patch 41, which can include, for example, a coating of a relatively low-tack repositionable, ultraremovable adhesive, a low coat weight adhesive, a pattern-coated adhesive, or a detackified adhesive, can have boundaries including a first side edge 41-1, a second side edge 41-2, an outer edge 41-3, and an inner edge 41-4. First side edge 41-1 can lie substantially flush with a portion of first side edge 17-1 of base 13, and second side edge 41-2 can lie substantially flush with a portion of second side edge 17-2 of base 13. Outer edge 41-3 can be located at a distance, a third distance, from end edge 17-3 that is slightly less than the length $l_4$ of overlay 31 as measured from outer edge 31-3 to inner edge 31-4, and inner edge 41-4 can be located at a distance, a fourth distance, from end edge 17-3 that slightly exceeds the length $l_4$ of overlay 31 as measured from outer edge 31-3 to inner edge 31-4. The locations of first side edge 41-1, second side edge 41-2, outer edge 41-3, and inner edge 41-4 define a first low adhesion area.

In this manner, as will be seen below, in a "Z-stack" of two or more media 11, adjacent media 11 will be arranged so that the inner edge 31-4 of overlay 31 of the lower medium 11 is aligned between outer edge 41-3 and inner edge 41-4 of the upper medium 11. Where medium 11 has the dimensions discussed above, outer edge 41-3 and inner edge 41-4 can be spaced apart from one another by a distance of, for example, approximately 3.0 mm. In other embodiments, outer edge 41-3 and inner edge 41-4 can be spaced apart from one another by a distance ranging from approximately 2.0 mm to approximately 5.0 mm.

Adhesive patch 43, which can include a coating of a relatively high-tack repositionable or ultraremovable adhesive, can have boundaries including a first side edge 43-1, a second side edge 43-2, an outer edge 43-3, and an inner edge 43-4. First side edge 43-1 can lie substantially flush with a portion of first side edge 17-1 of base 13, second side edge 43-2 can lie substantially flush with a portion of second side edge 17-2 of base 13, outer edge 43-3 can lie substantially flush with end edge 17-3 of base, and inner edge 43-4 can lie substantially flush with outer edge 41-3 of patch 41. The first side edge 43-1, second side edge 43-2, outer edge 43-3, and inner edge 43-4 also define a first high adhesion area.

Adhesive patch 45, which can be identical in composition to adhesive patch 43 and which can include a coating of a relatively high-tack repositionable or ultraremovable adhesive, can cover a second high adhesion area on the bottom surface of base 13 extending laterally substantially the full width of base 13 and extending longitudinally from inner edge 41-4 to a boundary 45-1 substantially aligned with inner edge 31-4 of overlay 31. Boundary 45-1 is located a distance, a fifth distance, from the first end edge 15-3, and the distance is greater than length $l_4$.

As discussed above, adhesive patch 43 and adhesive patch 45 can include relatively high-tack repositionable or ultraremovable adhesives, and adhesive patch 41 can include a relatively low-tack repositionable or ultraremovable adhesive. It should be understood that adhesive patches 41, 43, and 45 can include the same repositionable or ultraremovable adhesive that is detackified or pattern-coated to provide the necessary relative tack required for each patch. Alternatively, adhesive patch 41 can be a lower coat weight of the same adhesive used for adhesive patch 43 or adhesive patch 45. In one embodiment, the coat weight of adhesive patches 43 and 45 can range between approximately 5.5 grams/square meter (gsm) to approximately 6.5 gsm, and the coat weight of adhesive patch 41 can range between approximately 5.5 gsm to approximately 6.5 gsm. In other embodiments, the coat weight of adhesive patches 43 and 45 can range between approximately 3 gsm to approximately 12 gsm, and the coat weight of adhesive patch 41 can range between approximately 3 gsm to approximately 12 gsm.

Ultraremovable adhesives are discussed in the following patents and patent publications, all of which are incorporated herein by reference herein in their entireties: U.S. Pat. No. 6,328,518 to Wong, issued Dec. 11, 2001; U.S. Pat. No. 6,315,851 to Mazurek et al., issued Nov. 13, 2001; U.S. Pat. No. 5,656,705 to Mallya et al., issued Aug. 12, 1997; and U.S. Patent Application Publication No. US 2002/0047263 A1 to McCarthy et al., published Apr. 25, 2002. Additionally, a primer can be used with removable or ultraremovable adhesives to increase the anchorage of the adhesive to the base.

Figure 4:
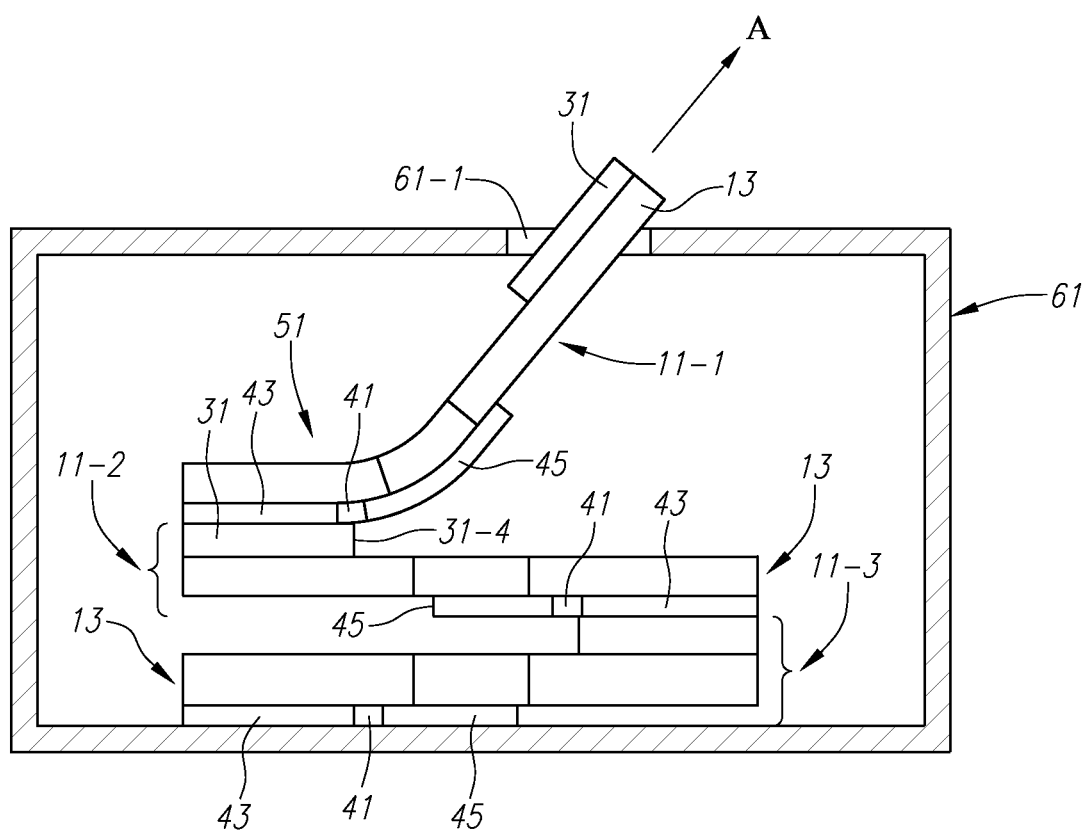
FIG. 4 is a simplified side elevational view, partly in section, of a plurality of the repositionable media of FIG. 1(a) in a "Z-stack," the "Z-stack" being disposed in a slotted dispenser.

Referring now to FIG. 4, there is shown a simplified side elevational view of three identical media 11-1, 11-2, and 11-3 arranged in a "Z-stack," the "Z-stack" being represented generally by reference numeral 51. (For ease of illustration and understanding, certain features of "Z-stack" are not shown.) As can be appreciated, although "Z-stack" 51 is shown including three stacked media, "Z-stack" 51 is not limited to a stack of three stacked media and could include, for example, a greater or lesser number of media. In FIG. 4, the uppermost medium 11-1 is shown being dispensed from a slotted dispenser 61, shown partly in section. Dispenser 61 can be similar to conventional dispensers but dimensioned appropriately for "Z-stack" 51.

As can be seen, to dispense the uppermost medium 11-1 from dispenser 61, a user can pull the exposed end of medium 11-1 away from the remainder of "Z-stack" 51, for example, by pulling the combination of end portion 15 of base 13 and overlay 31 of medium 11-1 through slot 61-1 in the direction indicated by arrow A. Although overlay 31 of middle medium 11-2 is in contact with adhesive on the bottom of uppermost medium 11-1, the separation of uppermost medium 11-1 from the remainder of "Z-stack" 51 is less likely to result in the delamination of overlay 31 from middle medium 11-2 than would otherwise be the case. This is because inner edge 31-4 of overlay 31 of middle medium 11-2 is in contact with adhesive patch 41 of uppermost medium 11, adhesive patch 41 is relatively low-tack, as compared to adhesive patches 43 or 45. Since the initiation of delamination is most likely to occur along inner edge 31-4 of overlay 31 when pulling medium 11-1 in the direction indicated by arrow A, the reduction in adhesion between 31 and medium 11-1 due to the use of adhesive patch 41, instead of the use of an adhesive similar to that of patches 43 and 45, is likely to result in a reduction in the occurrence of delamination.

Medium 11 can be marked and/or applied to objects in the conventional fashion.

Figure 5A:
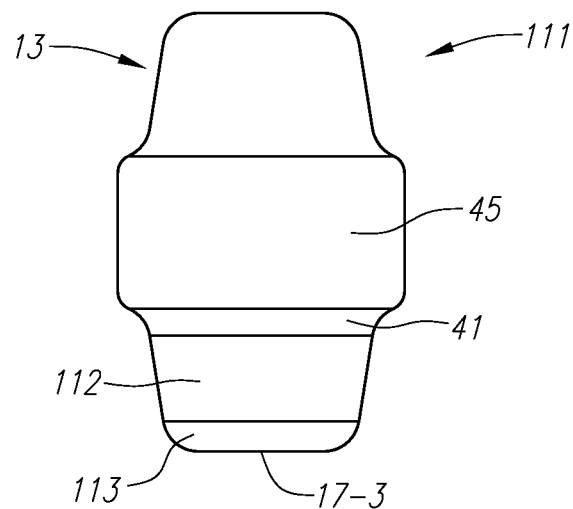
FIGS. 5(a) and 5(b) are bottom plan and side elevational views, respectively, of a second embodiment of a repositionable medium.
Figure 5B:
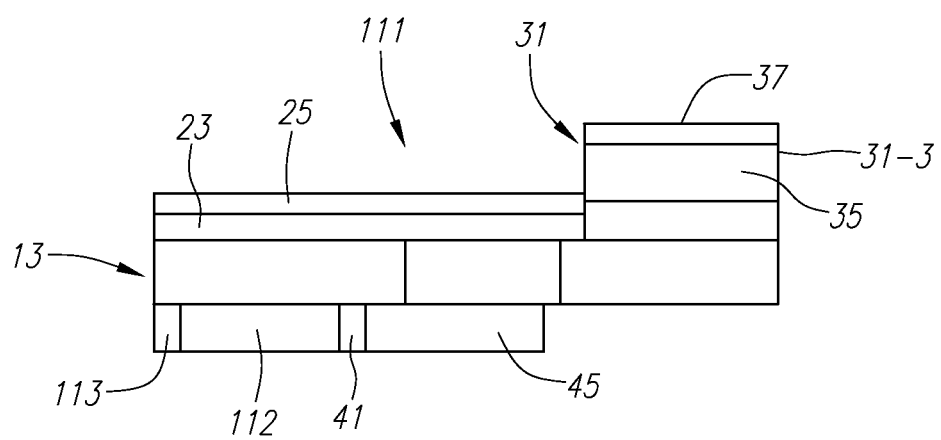

Referring now to FIGS. 5(*a*) and 5(*b*), there are shown bottom plan and side elevational views, respectively, of a second embodiment of a repositionable medium, the repositionable medium being represented generally by reference numeral 111.

Medium 111 can be similar in most respects to medium 11, the principal difference between the two media being that, in medium 111, the area occupied by patch 43 of medium 11 can be occupied with the combination of an adhesive patch 112, occupying the first high adhesion area, and an adhesive patch 113, adhesive patch 113 extending along edge 17-3 of base 13 and occupying a second low adhesion area. Adhesive patch 112 can be identical in composition to adhesive patch 43 and can include a relatively high-tack repositionable or ultraremovable adhesive. Adhesive patch 113 can be identical in composition to adhesive patch 41 and can include a relatively low-tack repositionable or ultraremovable adhesive. Patch 113 can serve to inhibit the initiation of delamination along outer edge 31-3 of overlay 31.

Medium 111 can be stacked, dispensed, marked, and/or adhered to an object analogously to medium 11.

Figure 6A:
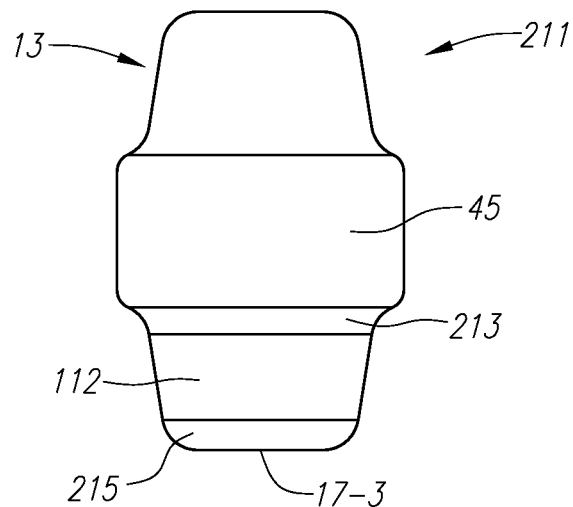
FIGS. 6(a) and 6(b) are bottom plan and side elevational views, respectively, of a third embodiment of a repositionable medium.
Figure 6B:
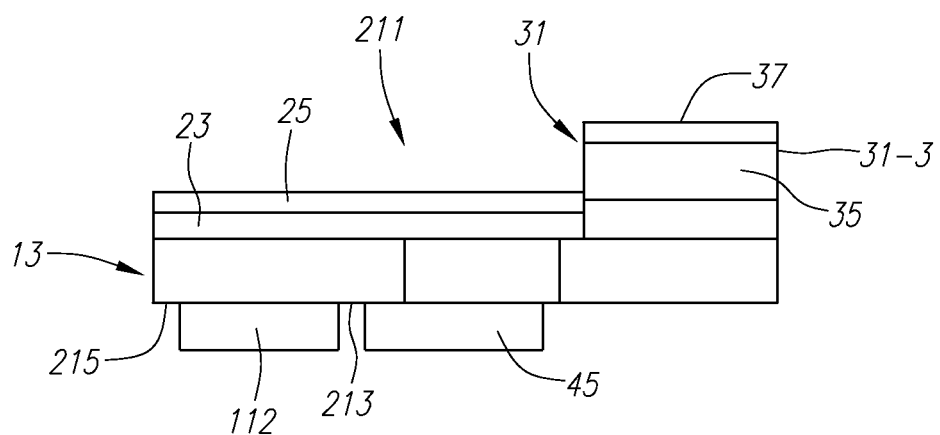

Referring now to FIGS. 6(*a*) and 6(*b*), there are shown bottom plan and side elevational views, respectively, of a third embodiment of a repositionable medium, the repositionable medium being represented generally by reference numeral 211.

Medium 211 can be similar in most respects to medium 111, the principal difference between the two media being that, in medium 211, no adhesive is positioned in the corresponding areas occupied by patches 41 and 113 of medium 111. Instead, medium 211 can include a first non-adhesive area 213 provided in the area corresponding to patch 41 of medium 11, and a second non-adhesive area 215 can be provided in the area corresponding to patch 113 of medium 11. In another embodiment (not shown), second non-adhesive area 215 can be occupied with an adhesive similar to that of patch 41 or similar to that of patches 43 and 45, with first non-adhesive area 213 remaining unoccupied by adhesive.

Medium 211 can be stacked, dispensed, marked, and/or adhered to an object analogously to medium 11.

Figure 7A:
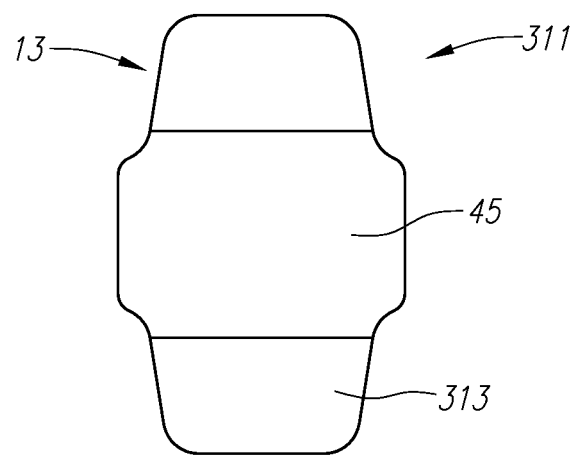
FIGS. 7(a) and 7(b) are bottom plan and side elevational views, respectively, of a fourth embodiment of a repositionable medium.
Figure 7B:
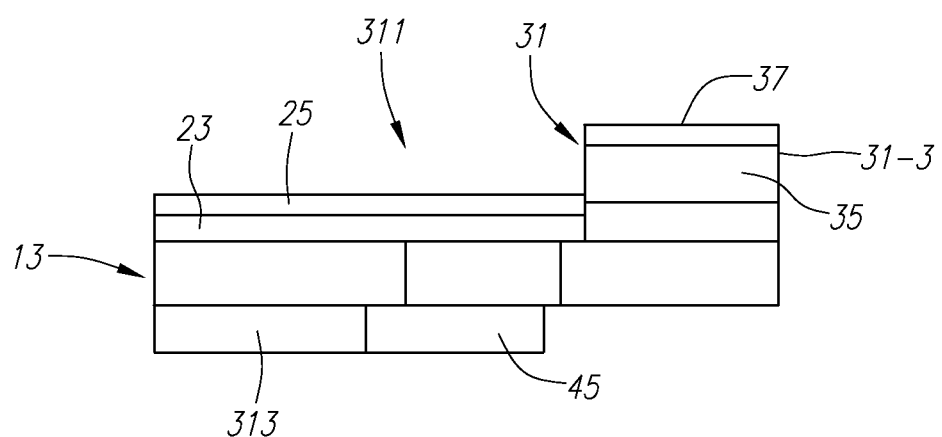

Referring now to FIGS. 7(*a*) and 7(*b*), there are shown bottom plan and side elevational views, respectively, of a fourth embodiment of a repositionable medium, the repositionable medium being represented generally by reference numeral 311.

Medium 311 can be similar in most respects to medium 11, the principal difference between the two media being that adhesive patches 41 and 43 of medium 11 can be replaced in medium 311 with an adhesive patch 313. Adhesive patch 313 can be identical in composition to adhesive patch 41 and can include a relatively low-tack repositionable or ultraremovable adhesive.

Medium 311 can be stacked, dispensed, marked, and/or adhered to an object analogously to medium 11.

Figure 8A:
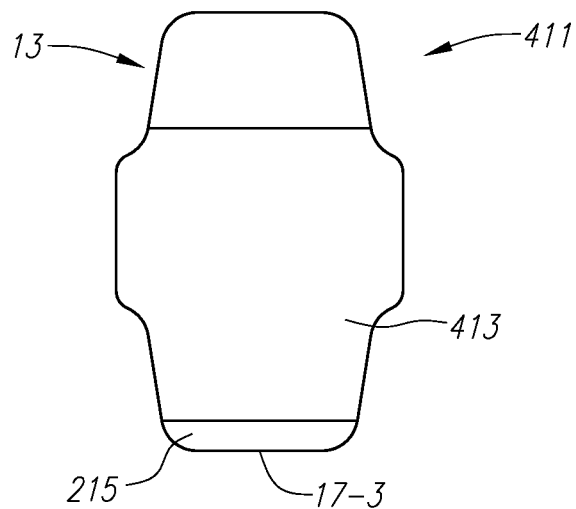
FIGS. 8(a) and 8(b) are bottom plan and side elevational views, respectively, of a fifth embodiment of a repositionable medium.
Figure 8B:
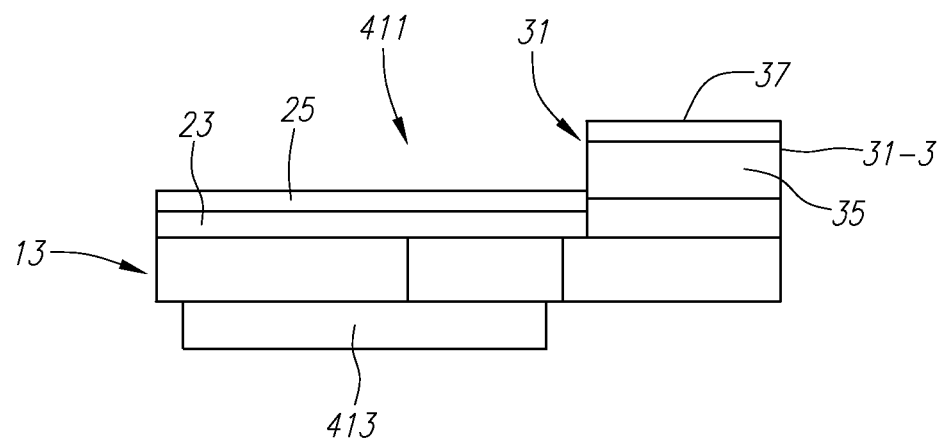

Referring now to FIGS. 8(*a*) and 8(*b*), there are shown bottom plan and side elevational views, respectively, of a fifth embodiment of a repositionable medium, the repositionable medium being represented generally by reference numeral 411.

Medium 411 can be similar in most respects to medium 211, the principal difference between the two media being that patches 45, 213 and 112 of medium 211 can be replaced in medium 411 with an adhesive patch 413. Patch 413 can include an adhesive similar to that of patch 45 of medium 211.

Medium 411 can be stacked, dispensed, marked, and/or adhered to an object analogously to medium 11.

Figure 9A:
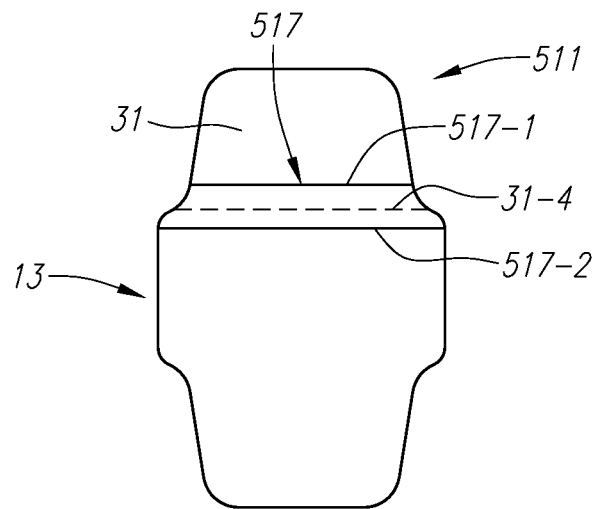
FIGS. 9(a) and 9(b) are top and bottom plan views, respectively, of a sixth embodiment of a repositionable medium.
Figure 9B:
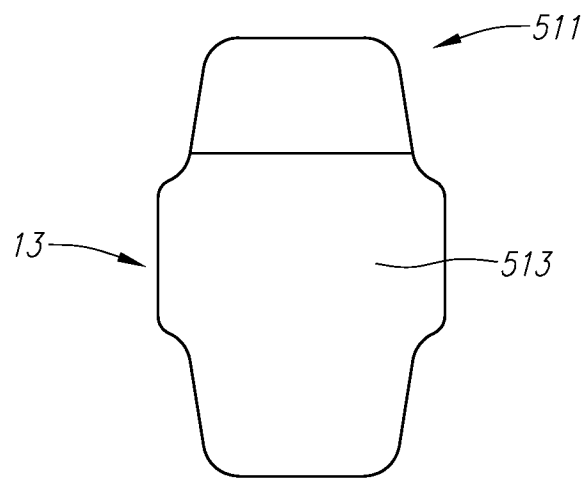

Referring now to FIGS. 9(*a*) and 9(*b*), there are shown top and bottom plan views, respectively, of a sixth embodiment of a repositionable medium, the repositionable medium being represented generally reference numeral 511.

Medium 511 can be similar in many respects to medium 11. One difference between the two media can be that medium 511 can include a single adhesive patch 513 covering the areas corresponding to the areas covered by patches 41, 43 and 45 of medium 11. Patch 513 can include a repositionable or ultraremovable adhesive similar to that of patches 43 and 45 of medium 11. Another difference between medium 511 and medium 11 can be that medium 511 can further include a strip of non-adhesive coating 517, for example, a lacquer coating, positioned over inner edge 31-4 (shown in phantom) of overlay 31, with a first edge 517-1 of non-adhesive coating 517 adhered to overlay 31 and with a second edge 517-2 of non-adhesive coating 517 adhered to base 13. Non-adhesive coating 517 can serve to inhibit the initiation of delamination of overlay 31 along inner edge 517-1. As can be appreciated, non-adhesive coating 517 could be replaced with other non-adhesive means, such as, for example, a single-sided adhesive tape.

Medium 511 can be stacked, dispensed, marked, and/or adhered to an object analogously to medium 11.

Figure 10A:
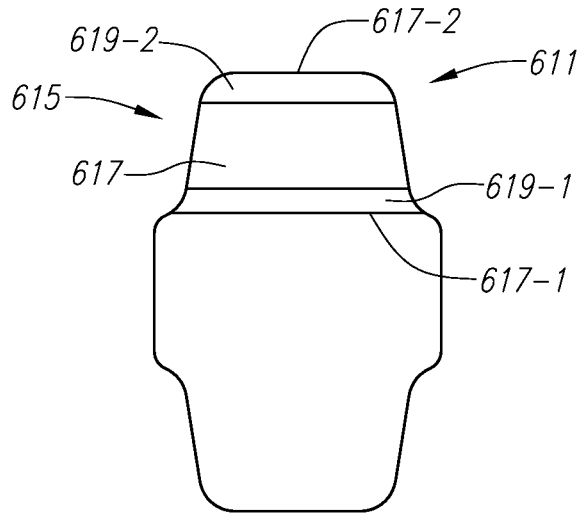
FIGS. 10(a) and 10(b) are top and bottom plan views, respectively, of a seventh embodiment of a repositionable medium.
Figure 10B:
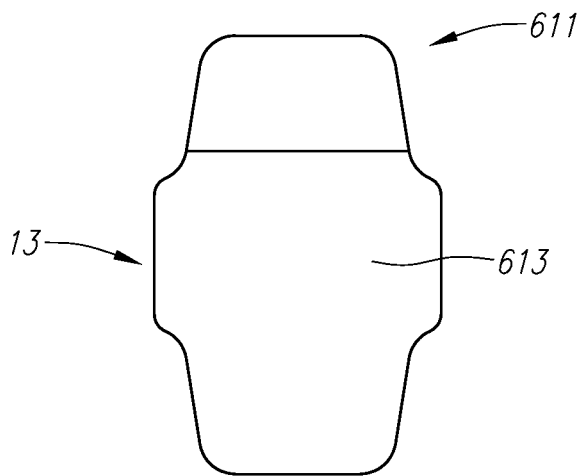

Referring now to FIGS. 10(a) and 10(b), there are shown top and bottom plan views, respectively, of a seventh embodiment of a repositionable medium, the repositionable medium being represented generally reference numeral 611.

Medium 611 can be similar in many respects to medium 11. One difference between the two media can be that medium 611 can include a single adhesive patch 613 covering the areas corresponding to the areas covered by patches 41, 43 and 45 of medium 11. Patch 613 can include a repositionable or ultraremovable adhesive similar to that of patches 43 and 45 of medium 11. Another difference between medium 611 and medium 11 can be that medium 611 can include an overlay 615, instead of overlay 31 of medium 11. Overlay 615 can differ from overlay 31 in that, whereas overlay 31 can include a writable release coating 37 applied over the entire top surface of paper sheet 35, overlay 615 does not include a writable release coating applied over the entire top surface of its paper sheet 617, but rather, can include a first band 619-1 of a writable release coating applied to the top surface of paper sheet 617 along an inner edge 617-1 of sheet 617 and a second band 619-2 of a writable release coating applied to the top surface of paper sheet 617 along an outer edge 617-2 of sheet 617. Bands 619-1 and 619-2 of the release coating can reduce adhesion between the overlay 615 of a first medium 611 and adhesive patch 613 on the bottom of a second medium 611 positioned directly thereover and, in so doing, can serve to inhibit the initiation of delamination of overlay 615 along inner edge 617-1 and/or along outer edge 617-2.

As can be appreciated, additional bands of the release coating can also be applied to the top surface of paper sheet 617 along each of its two side edges, thereby forming a frame around the perimeter of sheet 617, to inhibit the initiation of delamination of overlay 615 along either of its side edges.

Medium 611 can be stacked, dispensed, marked, and/or adhered to an object analogously to medium 11.

Referring now to FIG. 11, a flowchart for a method of manufacturing a repositionable medium in a "Z-stack" is shown generally at 700. At step 702, a base and an overlay are provided. A first adhesive is coated onto the base at step 704. In step 706, the overlay is laminated to the base. After steps 702-706, the material is sheeted into sheets at step 708. At step 710, the sheets are stacked in a "Z-stack" manner. The number of sheets in the stack is dependent on the number of tabs in the final stack of repositionable media. After stacking, the tabs are die cut at step 712. After being die cut, the "Z-stack" is placed into a dispenser at step 714.

In other embodiments of the method of manufacturing, a step of coating the base with a primer before the step of coating the first adhesive can be included. In yet another embodiment, a further step of coating a second adhesive can be included. Additionally, in yet another embodiment, the step of applying a topcoat can be included. In other embodiments, the step of applying a release coating or writable release coating to the overlay, the top surface of the base, or both the overlay and the top surface of the base can be included. In yet another embodiment, before the sheeting step, the unsheeted material can be rolled into roll form. The steps of sheeting, stacking, die cutting, and placing the "Z-stacks" into dispensers can be performed at different location than the coating steps.

Referring now to FIG. 12, a flowchart for a method of using a repositionable medium is shown generally at 750. In step 752, a first medium is removed from the dispenser, whereupon the second medium becomes accessible. In another step 754, the first medium is adhered to a substrate, and in another step 756, the first medium is written upon.

In any event, it is to be appreciated that in connection with the particular exemplary embodiment(s) presented herein certain structural and/or functional features are described as being incorporated in defined elements and/or components. However, it is contemplated that these features can, to the same or similar benefit, also likewise be incorporated in other elements and/or components where appropriate. It is also to be appreciated that different aspects of the exemplary embodiments can be selectively employed as appropriate to achieve other alternative embodiments suited for desired applications, the other alternative embodiments thereby realizing the respective advantages of the aspects incorporated therein.

Additionally, it is to be appreciated that certain elements described herein as incorporated together can under suitable circumstances be stand-alone elements or otherwise divided. Similarly, a plurality of particular functions described as being carried out by one particular element can be carried out by a plurality of distinct elements acting independently to carry out individual functions, or certain individual functions can be split-up and carried out by a plurality of distinct elements acting in concert. Alternatively, some elements or components otherwise described and/or shown herein as distinct from one another can be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A repositionable medium comprising:
   (a) a base, the base having a top surface, a bottom surface, a first end edge and a second end edge;
   (b) a paper fixedly coupled to the top surface of the base proximate to the first end edge, the paper having an inner edge and an outer edge, the outer edge is closer to the first end edge than the inner edge is to the first end edge, the inner edge is spaced from the first end edge of the base by a first distance; and
   (c) a first repositionable adhesive fixed to the bottom surface of the base, the first repositionable adhesive not being present in a first low adhesion area at a line across a width of the base and spaced from the second end edge of the base by a second distance, the second distance is equal in length to the first distance, wherein the low adhesion area extends from the second end edge of the base from a third distance slightly less than the second distance to a fourth distance slightly greater than the second distance.

2. The repositionable medium as claimed in claim 1, wherein the first low adhesion area extends entirely across the width of the base.

3. The repositionable medium as claimed in claim 1, wherein the first low adhesion area is devoid of adhesive.

4. The repositionable medium as claimed in claim 1 further comprising a second repositionable adhesive, the second repositionable adhesive occupying at least a portion of the first low adhesion area, the second repositionable adhesive is less tacky than the first repositionable adhesive.

5. The repositionable medium as claimed in claim 4, wherein the second repositionable adhesive is the same as the first repositionable adhesive and the second repositionable adhesive has a lower coat weight than the first repositionable adhesive.

6. The repositionable medium as claimed in claim 1, wherein the first low adhesion area extends entirely across the width of the base, the repositionable medium further comprising a second repositionable adhesive, the second repositionable adhesive occupying the first low adhesion area, the second repositionable adhesive is less tacky than the first repositionable adhesive.

7. The repositionable medium as claimed in claim 1, wherein the first repositionable adhesive is applied to the bottom surface of the base from the second end edge of the base to the third distance and is also applied to the bottom surface of the base from the fourth distance to a fifth distance, the fifth distance is spaced from the first end edge and is greater than the first distance.

8. The repositionable medium as claimed in claim 1, wherein the first low adhesion area extends entirely across the width of the base and wherein the first repositionable adhesive is also not present in a second low adhesion area positioned along the second end edge of the base, the first repositionable adhesive occupying at least some of the space between the first low adhesion area and the second low adhesion area.

9. The repositionable medium as claimed in claim 8, wherein both the first low adhesion area and the second low adhesion area are devoid of adhesive.

10. The repositionable medium as claimed in claim 1, wherein the base includes a polymeric film.

11. The repositionable medium as claimed in claim 10, wherein the polymeric film is translucent.

12. The repositionable medium as claimed in claim 11, wherein at least a portion of the polymeric film is coated with a marking-receptive coating.

13. The repositionable medium as claimed in claim 1, wherein the paper is fixedly coupled to the base using an adhesive.

* * * * *